United States Patent [19]
Daniel et al.

[11] Patent Number: 4,899,163
[45] Date of Patent: Feb. 6, 1990

[54] MICROWAVE PLATE ANTENNA IN PARTICULAR FOR DOPPLER RADAR

[75] Inventors: Jean-Pierre L. M. Daniel, Rennes; Phillipe Dupuis, Perros Guirec; Jean-Luc Alanic, Treguier, all of France

[73] Assignee: Le Centre Regional D'Innovation et de Transfert de Technologie de Bretagne Loi Le Centre National de la Recherche Scientifique, Etablissement Public National a Caractere Scientifique et Technologiqu, France

[21] Appl. No.: 230,466

[22] Filed: Aug. 9, 1988

[30] Foreign Application Priority Data

Sep. 9, 1987 [FR] France ................... 87 12579

[51] Int. Cl.⁴ .................................. H01Q 1/38
[52] U.S. Cl. .......................... 343/700 MS; 343/737
[58] Field of Search ............... 343/700 MS, 770, 771, 343/737

[56] References Cited

U.S. PATENT DOCUMENTS

| | | | |
|---|---|---|---|
| 3,363,253 | 1/1968 | Ratkevich et al. | 343/771 |
| 4,180,817 | 12/1979 | Sanford | 343/700 MS |
| 4,346,774 | 8/1982 | Hirota et al. | 343/771 |
| 4,603,332 | 7/1986 | Mead et al. | 343/700 MS |
| 4,633,262 | 12/1986 | Traut | 343/700 MS |
| 4,730,193 | 3/1988 | Schwartz et al. | 343/700 MS |

FOREIGN PATENT DOCUMENTS 0159301 10/1985 European Pat. Off. ......... 343/770
2187596 9/1981 United Kingdom .

OTHER PUBLICATIONS

Daniel et al., "Réseaux d'antennes imprimées dans la bande des 20 GHz/30 GHz." L'Onde Electrique, vol. 65, No. 1, 1985.

*Primary Examiner*—Joseph E. Clawson, Jr.
*Assistant Examiner*—Doris J. Johnson
*Attorney, Agent, or Firm*—Laff, Whitesel, Conte & Saret

[57] ABSTRACT

The antenna constituted by a plurality of identical parallel and symmetrical linear sub-networks (a7, a6, ... a1, a'1, a'2, ..., a'7). The centres of symmetry (b7, b≠b, ..., b1, b'1, b'2..., b'7) of the sub-networks (a7 to a'7) are aligned on a line (c) perpendicular to their diameter and are fed in phase. Each sub-network is constituted by a plurality of radiating elements in even numbers disposed at regular intervals and which radiate from fields displaced from 180° from one radiating element to the following. The pitch of the sub-network is approximately equal to a wave-length guided on the substrate of the printed circuit. Each radiating element is a conducting square surface the side of which is approximately equal to half the guided wavelength with one corner connected galvanically to the feed line. The direction of the surfaces change from one element to the following element.

13 Claims, 6 Drawing Sheets

MICROWAVE PLATE ANTENNA IN PARTICULAR FOR DOPPLER RADAR

The present invention concerns a microwave plate antenna and more particularly a Doppler radar antenna intended for measuring the actual forward speed of a vehicle such as a tractor.

The measurement of the actual forward speed of an agricultural tractor in relation to the ground is interesting for several reasons. Basing this measurement on the speed of rotation of one or two wheels leads to substantial errors. In fact the wheels of agricultural tractors are, according to the terrain, the load and the work carried out likely to skid. The degree of skidding is 25% at the observed time. Now, to optimize driving especially fuel efficiency one can try to reduce skidding to, for example, about 10%. The amount of skidding can only be determined by comparing the actual speed of displacement and the speed of at least one wheel. One may also wish to quantify the actual tractor distribution apparatus for products such as seeds, manure, weed killers etc, in order to obtain a precise spreading of a quantity of material per unit of surface. One may also wish, for example, in undertaking agricultural work, to measure the distance traversed by the tractor in order to determine the surface worked. The measuring of the actual speed of displacement, after integration, permits one to obtain this measurement with precision.

This type of Doppler radar may also be used in other applications such as the measurement of the speed and displacement of a train, the measurement of the speed of building site machines or even automobiles.

In order to measure on board a vehicle its actual speed, it is known to use a Doppler radar the emitted beam of which is reflected by the ground. In the application to land vehicles a Doppler radar may be conceived to function in microwaves or in ultrasonics. French Patent FR-A2554599 describes a device for measurement by ultrasonics but this device seems to lack precision. That is why is is proposed according to the invention to use a microwave Doppler radar. The state of the technology of microwave Doppler radar may be illustrated by the following patents: U.S. Pat. No. A-4354191, U.S. Pat. No. A-4316173, U.S. Pat. No. A-4527160, U.S. Pat. No. A-3997900, U.S. Pat. No. A-4517566, UK-A-2076610, EP-A-0123870, UK-A-2120859, UK-A-2172462 and EP-A-0095300.

The first seven documents cited above concern Doppler radar with horn antenna, the following two, radars with pointed antenna and the last one a radar utilizing the Janus method.

The radars with horn antenna have several drawbacks; they are cumbersome; projecting under the vehicle they are inclined to obtain a beam inclined about 35° towards the front or rear as the drawings of the documents UK-A-2076610 and EP-A-0123870 shows; they are therefore vulnerable and they are susceptible to the variations of inclination of the platform on which they are fixed.

In the documents UK-A-2120859 and UK-A-2172462 of radars with pointed antenna are described, intended to be mounted on aircraft. The pointed antenna produces beams of the "gamma" type and comprises as many points of access as beams produced, the feed points being excited successively so that the beams are also generated successively. The commutation of the feed points constitutes a complication. Furthermore in the field of land vehicle radar it is unnecessary to provide four or six beams.

In the document EP-A-0095300 a land vehicle radar is described utilising the Janus configuration well known in Doppler aircraft navigation. In practice two beams are provided, one directed towards the front and the other towards the rear, the two beams being produced by two different antennae.

One object of the present invention consists in providing a Doppler radar with Janus configuration comprising a single pointed antenna with a single access.

According to another feature of the invention a Doppler radar with Janus configuration is provided, the pointed antenna of which is constituted by a plurality of identical, parallel and symmetrical linear sub-networks, the centres of symmetry of the sub-networks being aligned on a line perpendicular to the longitudinal direction of the sub-networks and being fed in phase, each sub-network being constituted by a plurality of elements radiating in even numbers disposed at regular intervals and radiating from dephased fields of 180° from one radiating element to the other the pitch of the sub-network being equal to wave-length guided on the substrate of the printed circuit on which are printed the radiating elements and corresponding to the frequency of operation of the antenna.

According to another feature the elements radiating from a sub-network have their feeds balanced to reduce the secondary lobes.

According to another feature the plurality of sub-networks comprises or does not comprise the same number of sub-networks as elements radiating in a sub-network, a main printed main feed line feeding in series the centres of symmetry of the sub-networks.

According to another feature the radiating elements are "patchs" disposed alternately from one side and the other of a secondary feed line at the centre of symmetry of the sub-network.

According to another feature each radiating element is a conducting square surface the side of which is equal to half the guided wavelength one corner of which is connected galvanically to the second feed line and the diagonal of which passing through this galvanic point of contact is perpendicular to the longitudinal direction of the sub-network.

According to another feature the feeding of the centres of symmetry of the sub-networks is equally balanced.

According to another feature the balancing is or not the same on the main feed line as on the secondary feed lines.

According to another feature the balancings are realised by means of quarter wave transformers.

The features of the invention mentioned above as well as others will appear more clearly on reading the following description of one embodiment, the said description being made in relation to the attached drawings among which:

Figure 1:
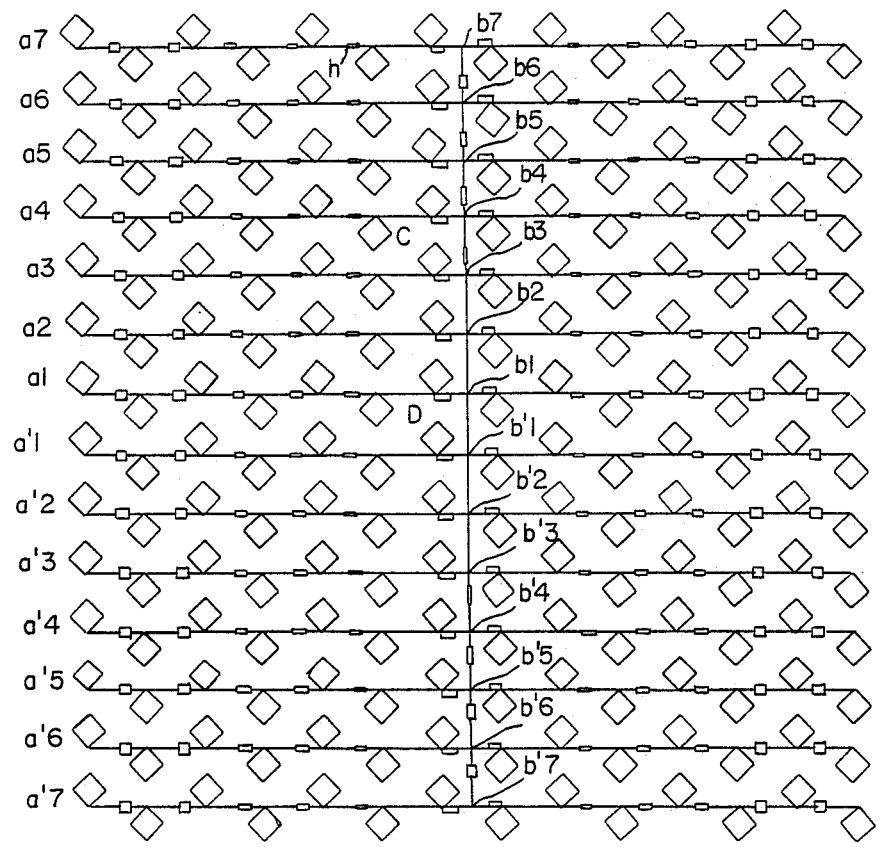
FIG. 1 is a view in plan of an antenna according to the invention.

The invention of FIG. 1 is formed by fourteen rows of radiating elements a7′, a6′, a5, a4′, a3, a2, a1, a′1, a′2, a′3, a′4, a′5, a′6, a′7. The rows a7 to a′7 are identical and parallel to one another; each of them are symmetrical in relation to their respective centres b7 to b′7 which are aligned along a line c perpendicular to the direction of the rows. The centres b7, b6, b5, b4, b3, b2, b1, b′1, b′2, b′3, b′4, b′5, b′6 and b′7 are equidirectional and respectively symmetrical two by two around a point d.

Figure 2:
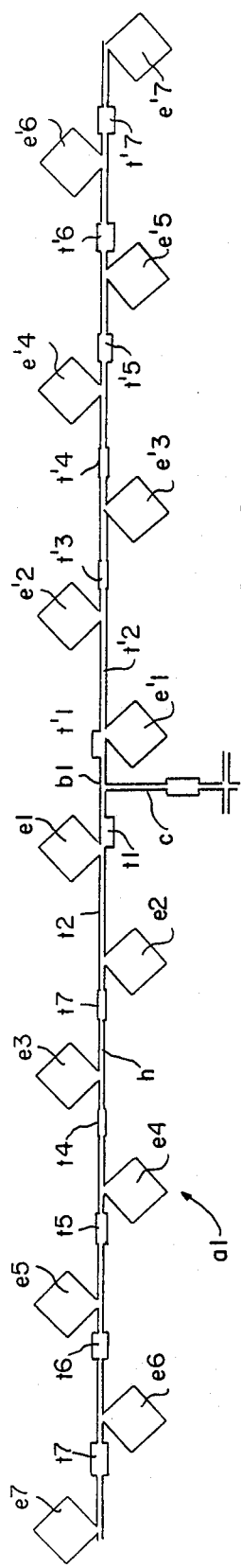
FIG. 2 is a view in plan on a larger scale of a row of radiating elements in the antenna of FIG. 1.
Figure 3:
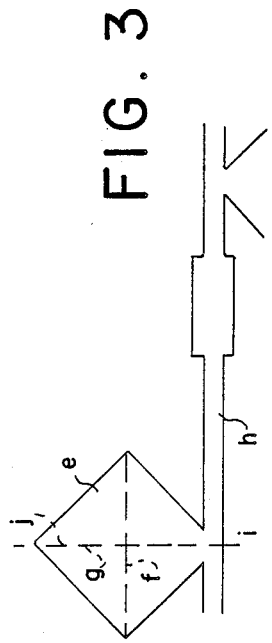
FIG. 3 is a view on a larger scale of a radiating element.

The row a1, shown in FIG. 2 comprises fourteen radiating elements e7, e6, e5, e4, e3, e2. e1 e′1, e′2, e′3, e′4, e′5, e′6, e′7. Each radiating element e shown on a larger scale in FIG. 3 has the shape of a conducting square surface one diagonal f of which is directed according to the rows and the other g according to the line c. In each radiating square element, one of the two summits i and j joined by the diagonal g here i is located on line b (FIG. 3). In each of the radiating elements e7, e5, e3, e1, e′2, e′4, e′6 the other summit j of the diagonal g is on the same side of the line h whilst the radiating elements e6, e4, e2, e′1, e′3, e′5 and e′7 have their summits j on the other other side of the line b. The summits i7 and i′7 of the elements e7 to e′7 are equidistant and are two by two symmetrical in respect of the centre b7 to b′7 of the corresponding rows.

It is to be noted that the whole of the elements e7 to e1 of the row a1, FIG. 1 is symmetrical in respect of the centre b1, of the whole of the elements e′1 to e′7. Each of the rows a7 to a′7 is deduced from the preceding one by simple translation and there is no symmetry of the rows in respect of the point d.

Figure 4:
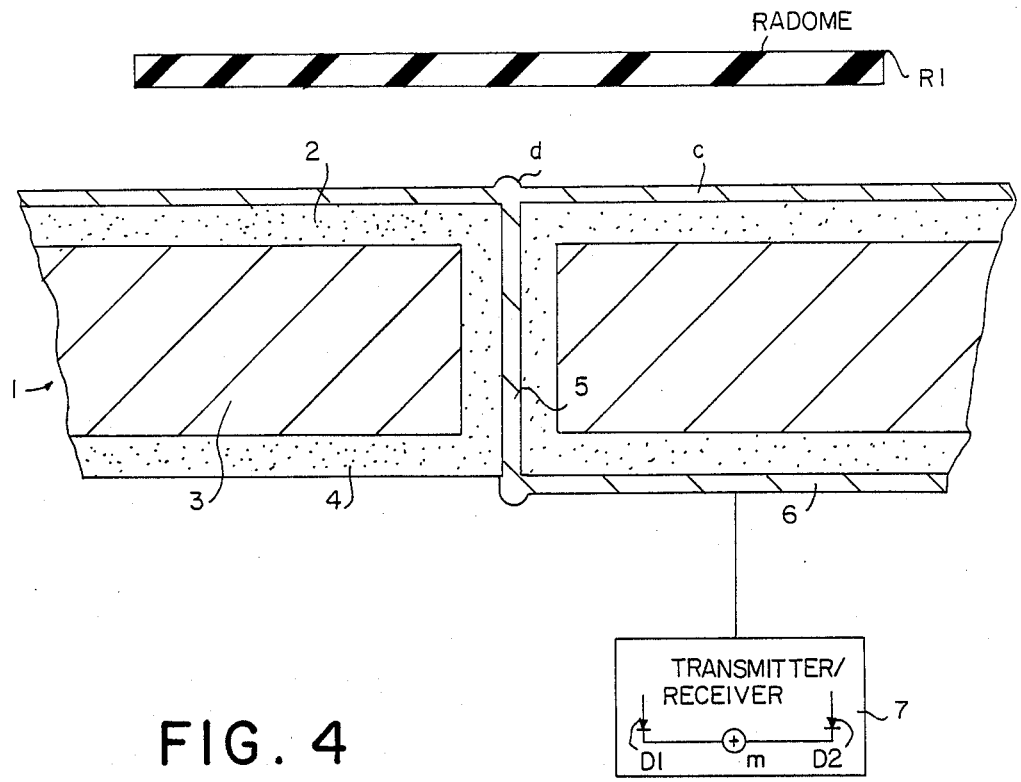
FIG. 4 is a partial view in cross section of the antenna on line IV—IV of FIG. 1.

The centres b7 to b′7 are connected by a feed conducting line c which is itself fed at the control point d as will be seen in connection with FIG. 4.

In each row such as in FIG. 2, the pivots i are connected by a conducting feed line h which is itself fed from the pivot b1 connected to the line c.

The respective distances between the centres b7 to b′7 and between the summits i7 to i′7 are equal to a wavelength λg which is defined below.

In a linear network of equidistant antennae the beam of which is depointed by an angle θ, x being the pitch of the network each individual antenna is fed with a phase shift Δφ in respect of the preceding antenna, the phase shift being:

$$\Delta\phi = 2\pi\lambda_o{}^d \sin$$

where λo is the wavelength in vacuum.

In the antenna of the invention an inter element distance equal to λg has been selected which is the propagation wavelength-guided on the substrate of the antenna. Thus for a substrate of the usual type teflon glass, λg=0.75λo. Furthermore the directional alteration in each row of the radiating elements entails from one radiating element to the following one a dephasing Δφ=180°. One therefore has:

$$\sin\theta = \frac{1}{2} / \frac{d}{\lambda_o} \simeq \frac{2}{3}$$

that is:

$$\theta = 41°8$$

As has been noted above each row such as row a1, FIG. 1 is composed of two symmetrical sets in respect of the centre b1. The result is that the directional diagram is itself symmetrical in respect of the normal plane to the network along the line c which is expressed by two main lobes inclined one at +41°8 and the other −41°8.

Such an antenna comprises secondary lobes which are reduced by balancing in each row the amplitudes of the excitation signals which are applied to the prints j of the radiating elements. With square radiating elements the side of the square of which is equal to λg/2 less approximately the thickness of the dielectric substrate by way of example, the weight coefficients have been selected mentioned in the following table.

TABLE

| Radiating element | Amplitude | Phase |
|---|---|---|
| a7 | 0.0517 | 180° |
| a6 | 0.1162 | 0° |
| a5 | 0.2609 | 180° |
| a4 | 0.4617 | 0° |
| a3 | 0.6870 | 180° |
| a2 | 0.8844 | 0° |
| a1 | 1 | 180° |
| a′1 | 1 | 0° |
| a′2 | 0.8844 | 180° |
| a′3 | 0.6870 | 0° |
| a′4 | 0.4617 | 180° |
| a′5 | 0.2609 | 0° |
| a′6 | 0.1162 | 180° |
| a′7 | 0.0517 | 0° |

In the antenna of FIG. 1 as in the row of FIG. 2 in order to realise these coefficients of balancing there is used on the feed line h quarter wave transformers such as the transformers t7, t6, t5, t4, t3, t2, t1, t′1, t′2, t′3, t′4, t′5, t′6 and t′7 which are placed on the feed line up-stream of the radiating element being the same reference mark. These transformers are obtained by increasing the width of the feed line by an amount which is calculated according to the formulae which may be found in the following technical works:

T. C. Edwards, "Foundation for Microstrip Circuit Design" edited by John W. Riley and Son, 1981.

I. J. Bahl, P. Bhartia, "Microstrip Antenna", Artech House, 1980.

J. R. James, P. S. Hall, C. Wood, "Microstrip Antenna Theory and Design" Peter Peregrinus Ltd., 1981.

Finally, along the line c which feeds the centres of the rows are likewise provided quarter wave transformers which provide the same coefficients of balancing as in the above Table. To obtain these coefficients it suffices, in the Table, to replace a1 by b1, a2 by b2 etc.

It will be noted that the transformers t1 and t′1, FIG. 2 are formed by diagrammatical widening of the line whilst for the other transformers the widening is symmetrical. On the functional plane of the transformers this is without importance but in the particular case of the transformers t1 and t′1 which are inevitably very close to the radiating elements e1 and e′1 the dissymetry is preformable in order that these radiating elements e1 and e′1 may retain the same form as the other elements.

The section of FIG. 4 shows the substrate 1 of the antenna which, by way of example, comprises three layers 2 to 4. The layers 2 and 4 are for example, of polypropylene for which, at the frequency of utilization of the antenna is at 24 GHz to dielectric constant $\epsilon_r$ is close to 2.2 and the tangent of the angle of less tg8 is equal to $10^{-3}$. The thickness of the layers 2 and 4 is preferably between 0.4 and 0.8 mm. The layer 3 is metallic and a good conductor, for example, of aluminium and has a thickness, preferably between 2 and 4 mm. The radiating elements, the feed lines c and h and the quarter wave transformers are realised in pointed circuit on the layers 2. The point d of the line c is connected to the lower face of the layer 4 by a conductor wire 5 which passes through the layers 2 to 4. The hole pierced in the layer 3 for the passage of the wire 5 has a diameter sufficient to ensure the insulation of the wire 5. Under the layer 4 the wire 5 is connected to a printed conductor line 6 which is connected to a Doppler emitter-receiver diagrammatically represented in the form of a block 7.

In practice this Doppler transmitter-receiver 7 comprises among other things a microwave oscillator, for example, on the basis of a GUNN diode and a single diode mixer, the whole being printed on the layer 4 like the line the 6. The Doppler transmittor-receiver 7 may as a variation comprise a mixing circuit M having two diodes D1, D2 for separating the signals originating from the two beams and therefore making a discrimination of direction.

Figure 5:
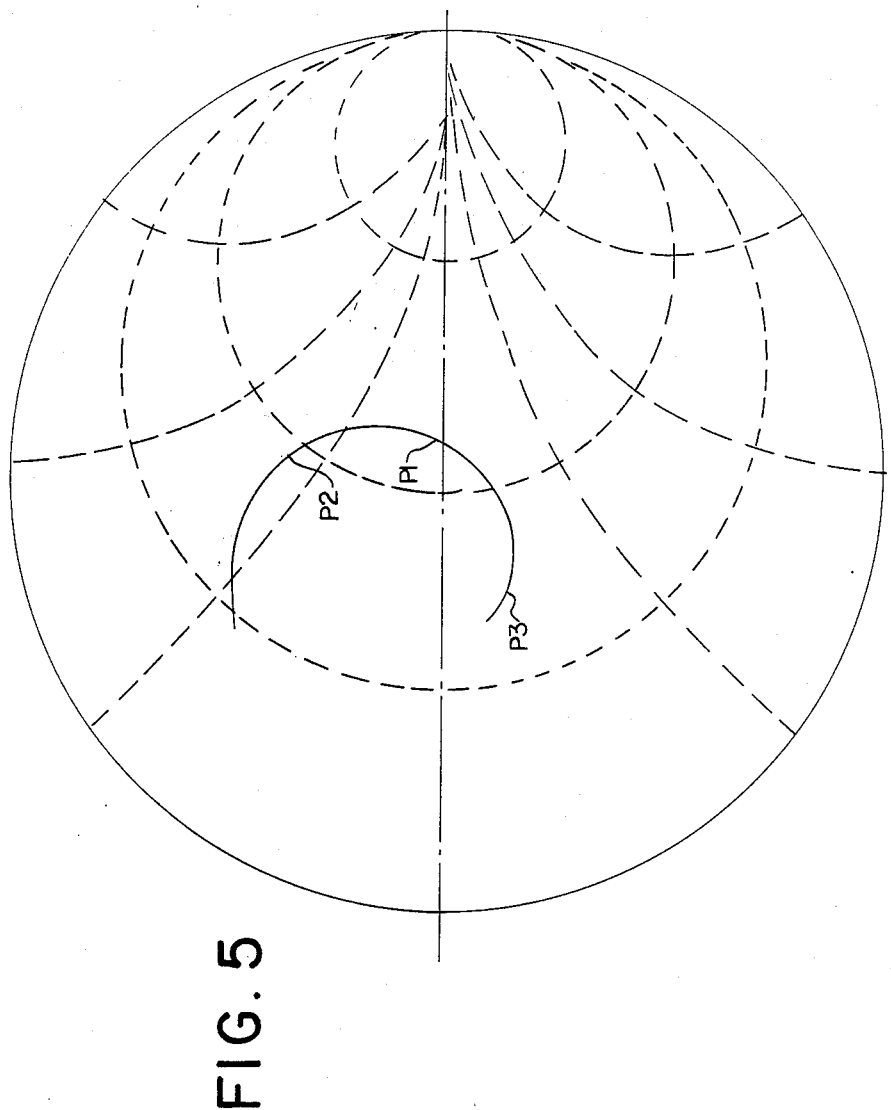
FIG. 5 is a Smith diagram illustrating the variations of the impedance of the antenna of FIG. 1.

The Smith diagram of FIG. 5 has been traced for different frequencies between 23.5 and 24.5 GHz. It appears that for a frequency of utilization of 24.1 GHz indicated by the marker P1, the antenna is particularly well adapted. The marker P2 and P3 correspond to the frequencies 23.8 GHz and 24.4 GHz. It appears on the diagram that around the frequency of 24.4 GHz the ratio of stationary waves ROS is good. It is to be noted also that for this frequency, FIG. 1 shows the antenna on the scale 1.

Figure 6:
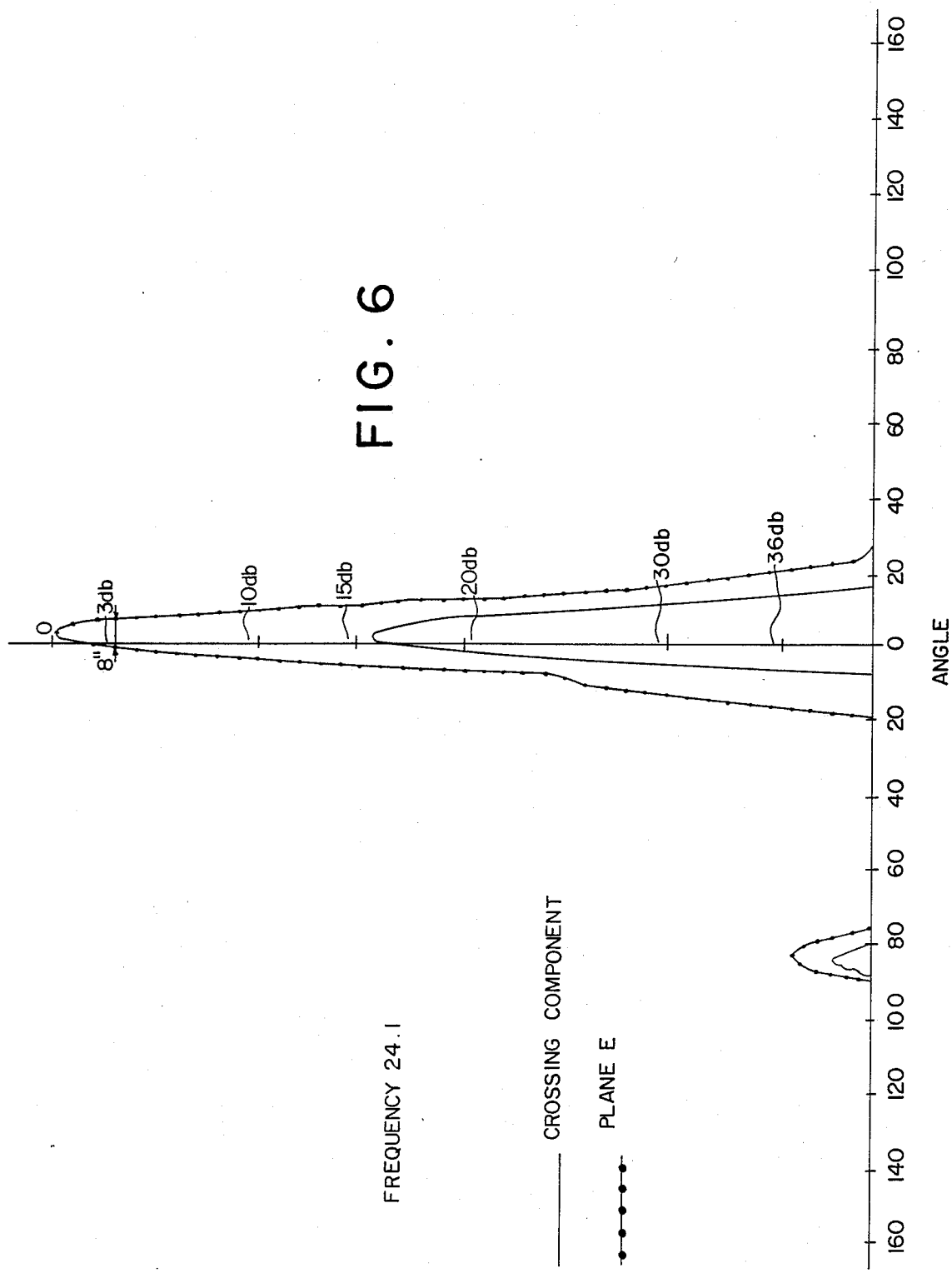
FIG. 6 shows directional diagrams of the antenna of FIG. 1 in the plane E.
Figure 7:
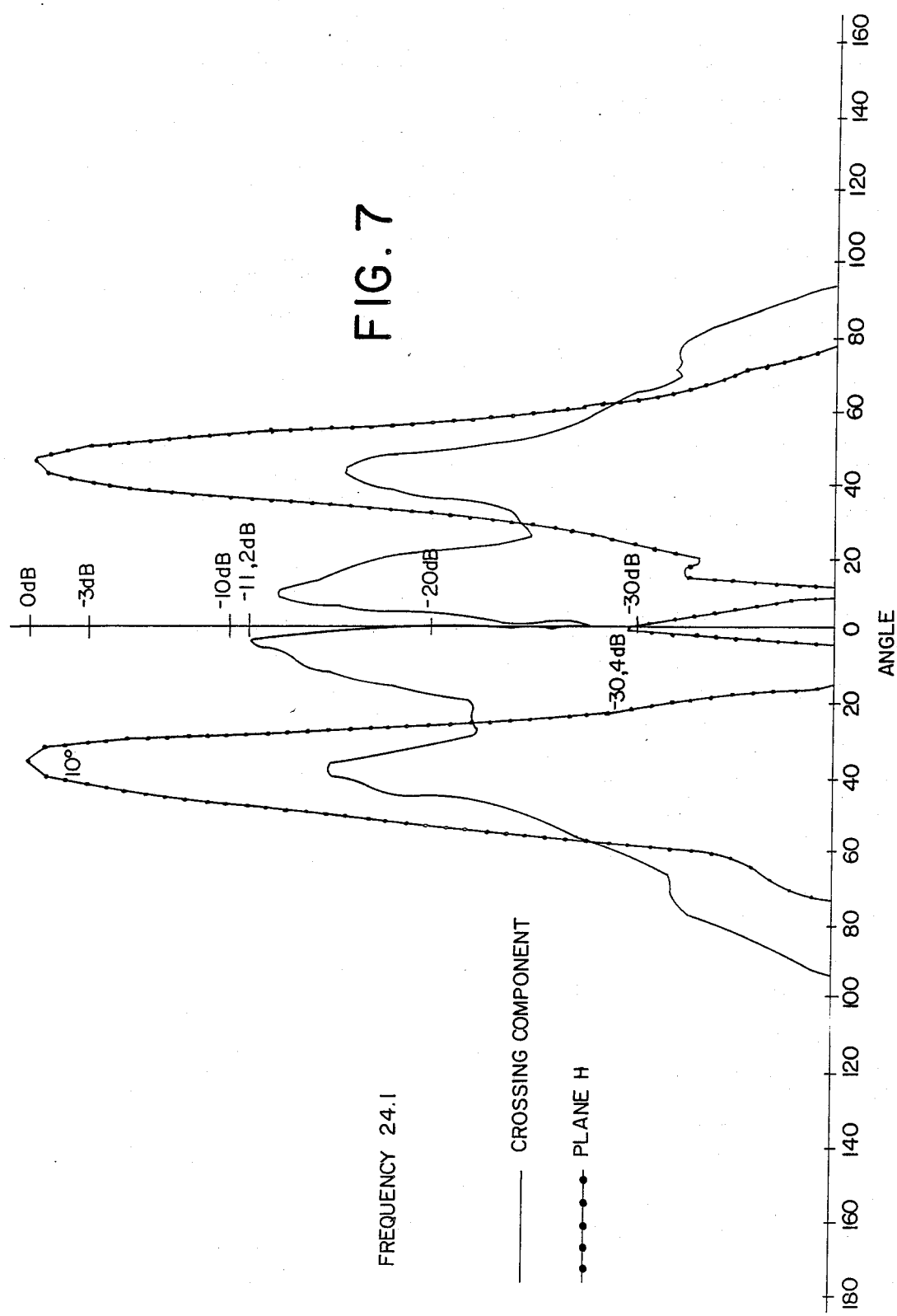
FIG. 7 shows directional diagrams of the antenna of FIG. 1 in the plane H.

The directional diagram of FIG. 6 traced for a frequency of 24.1 GHz show that the width of the lobe is less than 10°. The directional diagrams of FIG. 7 likewise traced for a frequency of 24.1 GHz show the two deposited lobes of $-40°$ and $+41°$ to widths of which at 3 dB are of the order of 20°. The secondary lobes are less than $-30$ dB which is particularly interesting.

In the embodiment which has just been described each radiating element was, as FIG. 3 shows, a square surface. This geometry which corresponds to a preferred embodiment is not indispensable. Thus one could choose a circular, triangular, pentagonal or other geometry on condition of retaining the symmetry in respect of a direction parallel to the line c.

The square, triangular or pentagonal geometries in which a summit of the elementary antenna is connected to the feed line permit of ensuring a good reproducibility of the feed conditions.

The circular geometry gives the possibility of utilizing a circular polarization but necessitates a greater manufacturing precision to ensure the reproducibility of feeding. The pentagonal geometry combines the different advantages mentioned above.

In the example described the number of rows is equal to the number of radiating elements in a row but that is obviously not necessary. In the case where the numbers are different the balancing is obviously not the same on the line c as in each row.

In utilizing the antenna of FIG. 1 measures have also been effected with a plane radome RI made of polypropylene which was placed in a parallel direction to the antenna in front of the latter. It has been found that the radome only very slightly reduced the performances of the antenna.

Measures have likewise been effected by associating the antenna with an emitter end and a receiver operating at 24.1 GHz to test the precision of the radar there formed. These measures have been effected on a simulator with a travelling band. It has been possible to verify by varying the inclination of the antenna in respect of the travelling band that the susceptibility to the variations of inclination was reduced to a substantial extend compared with the results obtained with a radar with a single beam.

We claim:

1. A microwave antenna having a Janus configuration for use in a doppler radar system, said antenna comprising a printed circuit board having thereon a plurality of substantially identical parallel and symmetrical elongated linear sub-networks, the pitch between said sub-networks being equal to a wave length of said signal, each of said sub-networks having an even number of radiating elements disposed at regular intervals along said sub-networks, each of said sub-networks having a center of symmetry aligned along a line perpendicular to said elongation of said linear sub-networks, said parallel networks being separated from each other by a uniform pitch, means for feeding each of said sub-networks an in-phase signal corresponding to the operational frequency of said antenna, said sub-networks radiating fields being dephased by 180° from one radiating element to the following radiating element.

2. The antenna of claim 1 wherein each of said radiating elements comprises a conductive patch on said printed circuit board, each of said patches being oriented to lie on a side of one said elongated linear sub-networks which is opposite to the side on which its neighboring patches lie, each of said patches having an axis lying in a direction parallel to said line perpendicular to said elongations of said linear subnetworks.

3. The antenna of either claim 1 or 2 and means for balancing the feeds to each of said networks for reducing secondary lobes of the pattern of said antenna.

4. The antenna of either claim 1 or 2 wherein there are N number, N is an integer, of said sub-networks and each of said sub-networks has N number of said radiating elements, and a printed circuit line extending through the center of symmetry of the sub-networks for feeding said signal to said sub-networks.

5. The antenna of either claim 1 or 2 and means for balancing the feeds to each of said networks for reducing secondary lobes of the pattern of said antenna, there being N number, N is an integer, of said sub-networks and each of said sub-networks having N number of said radiating elements, and a printed circuit line extending through the center of symmetry of the sub-networks for feeding said signal to said sub-networks.

6. The antenna of claim 4 wherein each of said sub-networks has M number, M is an integer, of radiating elements, where N does not equal M, and a printed circuit line extending through the center of symmetry of the sub-network for feeding said signal of said sub-networks.

7. The antenna of either claim 1 or 2 wherein there are N number, N is an integer, of said sub-networks and each of said sub-networks has M number, M is an integer, of radiating elements, where N does not equal M, and a printed circuit line extending through the center of symmetry of the sub-networks for feeding said signal to said sub-networks.

8. The antenna of either claim 1 or 2 wherein each of said radiating elements comprises a conductive patch on said printed circuit board, each of said patches being and distributed on opposite sides of said line perpendicular to said elongation.

9. The antenna of claim 3 wherein each of said radiating elements is a square conductive surface of said printed circuit board, the length of one side of said square being equal to one-half of the wave length of said signal, a corner of said square being galvanically connected to a feed line for said antenna and a diagonal of said square which passes through said corner being perpendicular to said elongation of said linear subnetworks.

10. The antenna of claim 1 and means for balancing said means for feeding said signal.

11. The antenna of claim 8 wherein said balancing means is a quarter wave length transformer.

12. The antenna of claim 1 and a doppler transmitter-receiver comprising a microwave oscillator and a mixer and two diodes coupled to separate two beams radiating from said antenna.

13. The antenna of claim 1 and a plane radome in a parallel direction in front of said antenna.

* * * * *